March 12, 1957  G. R. POSTLEWAIT  2,784,561
LIQUEFIED GAS VALVE
Filed April 11, 1955

GEORGE R. POSTLEWAIT,
INVENTOR.
HUEBNER, BEEHLER,
WORREL & HERZIG,
ATTORNEYS.
BY:

United States Patent Office 2,784,561
Patented Mar. 12, 1957

2,784,561

LIQUEFIED GAS VALVE

George R. Postlewait, Arcadia, Calif.

Application April 11, 1955, Serial No. 500,408

6 Claims. (Cl. 62—1)

This invention relates to improvements in valves and more particularly to valves for filling fluids into tanks and for withdrawing fluids from tanks.

I have chosen to illustrate and describe my invention as the same is embodied in a valve adapted for use in filling a tank with a volatile liquid, e. g. butane and propane, and in withdrawing liquid from the tank, this for the reason that the advantages of the invention appear to be more readily apparent when the invention is so illustrated and described. I desire to have it understood, however, that my invention is not limited in its use for controlling the flow of a volatile liquid, for the invention may be advantageously employed as a tank valve for fluids other than those just referred to.

Tanks containing propane for use as fuel are maintained under pressure to keep a substantial quantity of the propane in liquid phase, the remaining volume of the tank being filled with gaseous propane, which is withdrawn as needed for fuel. To fill a fuel tank with propane from a storage or truck tank it is necessary that the entering propane be under pressure greater than that in the tank being filled. In practice this is accomplished by connecting a pump into the line from the storage or truck tank to the tank to be filled. If the pressure in the truck tank is greater than that in the tank to be filled, flow may be effected directly without the use of a pump.

It is an object of this invention to provide a valve assembly for spraying liquid propane into a fuel tank near the top wall of the tank and thus into the propane gas in the fuel tank. When the higher pressured liquid enters the tank which is under a lower pressure, the entering liquid expands and thus is cooled. This cooling due to expansion cools the gaseous propane in the fuel tank, thereby reducing the tank pressure and maintaining a differential in the pressures of the entering liquid and in the fuel tank.

In conventional filling methods, it is usually necessary to provide a return conduit leading from the top of the fuel tank to the top of the storage or truck tank for returning displaced gas from the fuel tank into the storage or truck tank. It is also customary to connect a meter in the inlet flow line to measure the volume of liquid passed into the fuel tank, thereby to determine the filling costs to the customer. Under this procedure it is seen that the customer loses the gas which is returned from his tank to the storage or truck tank and thus he is overcharged.

It is an object of this invention to provide an improved valve assembly and method of filling a fuel tank by which it makes it possible to fill a fuel tank without returning displaced gas from the fuel tank to the storage tank.

Oftentimes it is desired to withdraw liquid propane from a fuel tank and for this purpose conventional tanks are provided with two openings containing appropriate valve assemblies, one for admitting liquid into the tank and the other for withdrawing liquid from the tank. It is an object of this invention to provide an improved valve assembly adapted to serve for both admitting liquid into a tank and withdrawing liquid from the tank.

A further object of the invention is to provide an improved valve assembly adapted to serve for both admitting liquid into a tank and withdrawing liquid from the tank, and in the filling operation to cause expansion of the entering liquid into the vapor space of the tank to create the above mentioned cooling effect.

A further object of this invention is to provide a valve assembly of the above mentioned character, which is constructed to contain certain valve parts of conventional design, this for the purpose of making it economical and inexpensive to manufacture the new valve and to permit replacement of parts therefor with parts for valves now in general use.

Further objects and advantages of the invention will appear during the course of the following part of this specification wherein the details of construction and mode of operation of an embodiment of the invention are described with reference to the accompanying drawing, in which.

Figure 1:
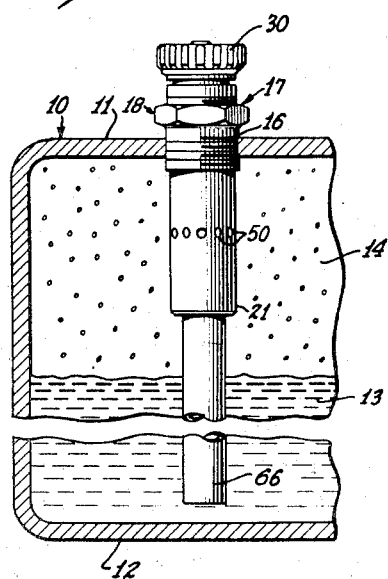
Fig. 1 is a vertical section of a fuel tank having a valve assembly embodying this invention fitted therein.

Referring to the drawing in greater detail and with the use of reference numerals, a fuel tank is illustrated in Fig. 1 of the drawing and designated generally by reference numeral 10. It includes a top wall 11 and a bottom wall 12. The tank is shown as containing liquid propane 13 and gaseous propane 14 above the level of the liquid.

The tank has an opening 16 formed in the top wall thereof and the walls defining such opening are screw-threaded for securing therein a valve assembly embodying the invention and designated generally by reference numeral 17. Such valve assembly comprises a valve body 18 made up of a neck section 19, an intermediate section 20, and a lower end section 21, each of the sections being threadably connected to its adjacent section. The body is tubular, having an axially disposed bore or passage, designated generally by reference numeral 22, extending through the three sections thereof. The upper end of the neck section defines a filling inlet opening of the valve assembly, and the lower end of the lower section 21 defines a liquid withdrawal opening. In the illustrated embodiment, the passage 22 is circular in cross section. Preferably there is thin gasket 23 of copper fitted between adjacent end face portions of the neck section and intermediate section.

The neck section 19 is provided with conventional external threads 25 adjacent its top end for threadably connecting the female end of a standard hose coupling (not shown) used in filling the tank and in withdrawing liquid from the tank. Inwardly of its top end the neck section is of reduced internal diameter as represented at 26, to form a shoulder 27 facing toward the top end of the neck section and a shoulder 28 facing inwardly of the valve body. The shoulder 27 constitutes a seat for a recessed gasket 29, which permits hand tight coupling to the valve of a hose coupling or of a cap 30, which cap covers the top end of the valve. The gasket 29 provides a gas-tight seal during periods of liquid flow through the valve and after filling operations. A portion of the reduced diameter of the neck section is internally threaded for threadably receiving the cap 30.

Around the inside portion of the shoulder 28 is an inwardly projecting ledge 32, forming an annular seat engageable by a valve disc 33. The valve disc is moveable in the valve body as an upper check valve, permitting flow of fluid downwardly through the valve and normally closing the valve against back pressure from inside the tank. In its preferred form the valve disc has a top surface 34 constituted of synthetic rubber and held on the valve disc as by screw 35, thereby to insure a gas-tight seal when the valve disc is in its seated position.

Spaced below the upper check valve is a lower check valve comprising a valve disc 37 seatable against an annular seat 38 projecting radially inwardly from the inside wall of the valve body. The upper and lower check valves are inter-connected for independent operation by a stem assembly 39, comprising a stem 40 for the valve disc 33, a stem 41 for the valve disc 37, and a sleeve 42 in which the stems 40 and 41 are axially moveable. A coil spring 43 is arranged around the stem 40 for engagement at one end of the spring with the under surface of the disc 33 and at its opposite end with the top end portion of sleeve 42, thereby to bias the valve disc upwardly in a direction away from the sleeve and toward its seat 32. For the lower valve disc there is a coil spring 44 contained within the sleeve and engageable at its upper end with a head 45 on the stem 41 and at its lower end with an internal flange 46 on the lower end of the sleeve, thereby to bias the valve disc 37 upwardly in a direction toward the sleeve for engagement with its seat 38. There is a plurality of radially extending vanes 47 positioned in that portion of the flow passage between the two check valves for maintaining the stem assembly and the valve discs coaxially disposed in the flow passage.

As thus far described, the illustrated embodiment of the valve of my invention is conventional in design and construction. The two check valves serve normally to prevent discharge of pressurized fluid from the tank and to allow fluid to flow into the tank. The provision of two back pressure check valves is for safety purposes, e. g. in the event that the upper check valve is held in partially open position by dirt or scale becoming lodged between the valve disc and its seat, the bottom check will prevent discharge of the tank contents.

Figure 2:
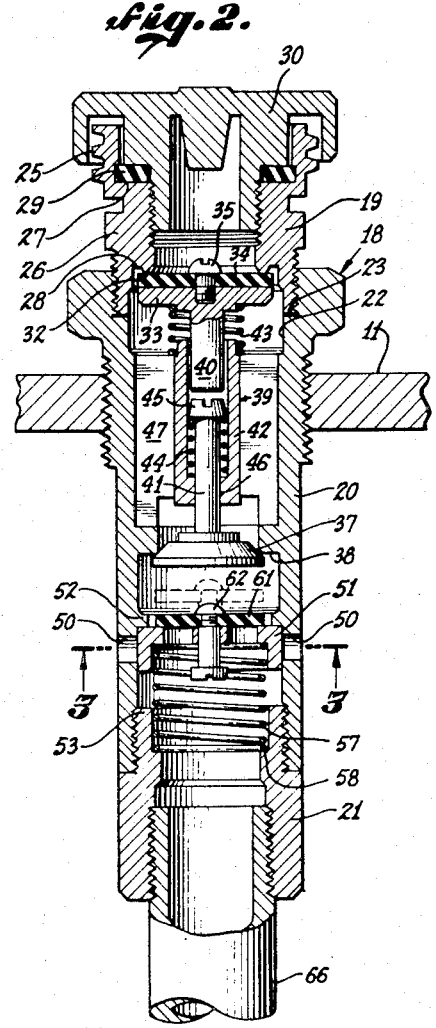
Fig. 2 is a central longitudinal section through the valve assembly.
Figure 3:
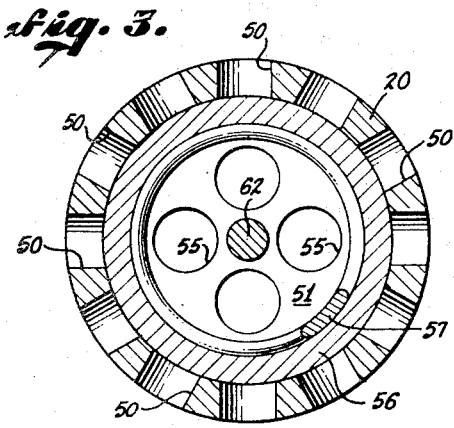
Fig. 3 is a cross section on an enlarged scale through the valve assembly, as taken on line 3—3 of Fig. 2.
Figure 4:
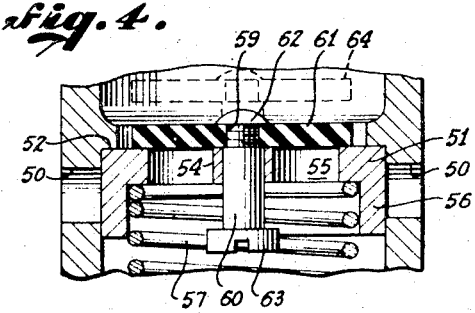
Fig. 4 is a central longitudinal section on an enlarged scale through that portion of the valve assembly in the region of line 3—3 of Fig. 2.

According to the invention, the valve body has a plurality of outlet ports 50 formed in the walls thereof and these ports are disposed in a circumferentially arranged series around the valve body and lying in a common plane passing transversely through the valve body at a location below the double check valve assembly just described. The body walls defining that section of the passage 22 in the region of the outlet ports are cylindrical for receiving a spider 51, which is moveable in an axial direction in the passage between a stop 52 above the outlet ports, being constituted of an inwardly extending annular flange, and a stop 53 below the outlet ports and constituted by the top annular face of the lower end section 21. The spider has a hub 54 and a series of circularly arranged openings 55 around the hub. The rim of the spider is formed of a cylindrical flange 56, having an axial dimension sufficient to cover the outlet ports when the spider is moved to against its stop 52, i. e. to the full line position thereof shown in Figs. 2 and 4. Also, the flange fully uncovers the outlet ports when the spider is moved downwardly against the stop 53. For normally biasing the spider upwardly to its port-covered position, there is a coil spring 57, one end of which is received in the cylindrical flange 56 and engageable with the under side of the spider, while the other end of the spring is engageable in an annular shoulder 58 on the inside wall of the valve body.

The hub 54 has a bore 59 extending co-axially therethrough for receiving a stem 60, which is slideable in axial direction in the hub. A valve disc 61 of resilient material, e. g. synthetic rubber, is secured to the upper end of the stem 60 as with a screw 62, and this valve disc is large enough in diameter to cover the openings 55 in the spider, thus to prevent flow of fluid downwardly through the openings 55. The lower end of the stem 60 has a head 63 which limits movement of the valve disc 61 from above the top face of the spider to the broken line position thereof shown at 64.

Threadably fastened in the lower end section 21 of the valve body is one end of a dip tube 66, which extends to adjacent the bottom wall of the tank and serves to conduct liquid upwardly into the valve when it is desired to withdraw liquid from the tank.

The mode of operation of the valve during a tank-filling operation is next described. To fill the tank with liquid propane, the valve is connected to a hose leading from a storage or truck tank containing liquid propane. If the pressure in the storage or truck tank is less than that in the tank to be filled, it is necessary to connect a pump in the filling hose. To connect such hose to the valve 17, the cap 30 is removed and the hose, having a conventional coupling, is connected to the valve at the threads 25 thereof. The pressure of the propane in the hose being greater than that in the tank, the entering propane will force both the upper and the lower check valves 33 and 37 downwardly in the valve body away from their respective seats, so that liquid will flow past these valves.

The pressure of the liquid propane in the valve, acting against the top surface of disc 61, forces the spider 51 downwardly, compressing the spring 57, whereby the outlet ports 50 will be open and the liquid propane will be sprayed out from the valve body through these ports. Since the valve is positioned in the top wall of the tank, its outlet ports will be proximate the top wall and thus the liquid passing through the ports will be sprayed into the propane gas 14 in the tank. In the illustrated embodiment the outlet ports extend radially outwardly from the flow passage of the valve body, and thus the liquid propane will be sprayed in a plurality of radially extending streams around the valve body, which streams are in a common horizontal plane, at least for a substantial portion thereof from adjacent the outlet ports. Spraying of the pressurized liquid propane into the gas in the tank results in expansion of the entering liquid causing the gas in the tank to be cooled and thus substantially reducing the tank pressure. This permits filling the tank with liquid at less pressure than has been required heretofore.

Reduction of gas pressure in the tank as a result of the above mentioned cooling effect makes it possible to fill the tank to customary height of liquid without exhausting gas from the tank. Thus the customer does not lose any gaseous fuel for which he previously paid.

When the filling operation is discontinued, the spider 51 will return to its outlet port-closing position, due to the pressure of its spring 57, and the valve discs 37 and 33 will return to their respective closed positions under pressure of their coils springs, thus preventing discharge from the tank and permitting disconnection of the filling hose and replacement of cap 30.

To withdraw liquid propane from the tank 11, the cap 30 is removed and a conventional evacuating adapter coupling (not shown but of well known design) with a hose or pipe connected thereto, is inserted in the top end of the valve for depressing the valve disc 33, which in turn depresses disc 37 when the stem 40 engages stem 41. Since the outlet ports 50 are covered by the spider 51, tank pressure is transmitted through the flow passage in the valve only through the dip tube 66. Unseating of the check valves 33 and 37 by the adapter coupling will release the back pressure in the valve passage whereby the tank pressure will force the disc 61 above the surface of the spider to uncover openings 55 in the spider, permitting flow of liquid from the bottom portion of the tank, through the dip tube 66, openings 55 of the valve, and past the valve discs 37 and 33.

While I have herein shown and described my invention in what I have conceived to be the most practical and preferred embodiment, it is recognized that departures may be made therefrom within the scope of my invention, which is not to be limited to the details disclosed herein, but is to be accorded the full scope of the claims so as to embrace any and all equivalent structures.

Having described my invention, what I claim as new and desire to secure by Letters Patent is:

1. A valve assembly for mounting in a fluid passage and comprising a tubular body having a flow passage extending axially therethrough and defining an inside wall for the body, one end of the passage defining an inlet opening formed in the body, the other end of the passage defining a withdrawal opening formed in the body, the body having a plurality of outlet ports formed therein arranged substantially in a plane passing through the body intermediate said openings, a valve seat extending around said inside wall intermediate the inlet opening and the outlet ports, a valve element intermediate the said seat and the outlet ports, means for yieldably urging the valve element toward said seat to valve-closed position, a sleeve axially slidable in the flow passage and being of sufficient axial dimension to cover said outlet ports, stop means on the said inside wall for limiting movement of the sleeve in a first direction toward the first valve element beyond a position where the outlet ports will be uncovered by the sleeve, the sleeve being movable in a direction opposite to said first direction to a position where the outlet ports are uncovered, means for yieldably urging the sleeve toward said stop means to port closed position, a check valve in the sleeve permitting flow of fluid in the passage in said first direction.

2. A tank having a top wall and a bottom wall, said top wall having a valve receiving aperture formed therein, and a valve assembly mounted in the aperture for controlling flow of fluid into the tank and for controlling flow of fluid from the tank; said valve assembly comprising a tubular body having one end thereof disposed exterior of the tank and the other end thereof disposed interior of the tank, the body having a flow passage extending axially therethrough and defining an inside wall for the body, one end of the passage defining an inlet opening exterior of the tank, the other end of the passage defining a withdrawal opening interior of the tank, the body having a plurality of outlet ports formed therein arranged substantially in a plane passing through the body intermediate said openings and interior of the tank, a valve seat extending around said inside wall intermediate the inlet opening and the outlet ports, a valve element intermediate the said seat and the outlet ports, means for yieldably urging the valve element toward said seat to valve-closed position, sleeve means slidable axially in the flow passage and being of sufficient axial dimension to cover said outlet ports, stop means on the said inside wall for limiting axial movement of said means in a first direction toward the first valve element to a position where said means covers the outlet ports, the sleeve means being movable in a direction opposite to said first direction to a position where the outlet ports are uncovered, means for yieldably urging the sleeve means toward said stop means to port-closed position, a check valve in the sleeve means permitting flow of fluid in the passage in said first direction; and a conduit in the tank having one end thereof adjacent the said bottom wall and the other end thereof connected to the valve body at the said withdrawal opening of the body.

3. A valve assembly for mounting in a fluid passage and comprising a tubular body having a flow passage extending axially therethrough and defining an inside wall for the body, one end of the passage defining an inlet opening, the other end of the passage defining a withdrawal opening, the body having a plurality of outlet ports formed therein and arranged substantially in a plane passing through the body intermediate said openings, a valve seat extending around said inside wall intermediate the inlet opening and the outlet ports, a valve element intermediate the said seat and outlet ports, means for yieldably urging the valve element toward said seat to valve-closed position, a spider slidable axially in the flow passage and being of sufficient axial dimension to cover said outlet ports, stop means on the said inside wall for limiting axial movement of the spider in a first direction toward the valve element to a position where the spider covers the outlet ports, the spider being movable in a direction opposite to said first direction to a position where the outlet ports are uncovered, means for yieldably urging the spider toward said stop means to port-closed position, openings in the spider, and the disc of yieldable material covering the spider openings and permitting flow of fluid in said first direction through the spider openings.

4. A valve assembly for mounting in the top wall of a tank and comprising a tubular body having a flow passage extending axially therethrough and defining an inside wall for the body, one end of the passage defining an upstream opening, the other end of the passage defining a withdrawal opening, the body having a plurality of outlet ports formed therein and disposed in a circumferentially arranged series around the body in a plane passing through the body intermediate said openings, a check valve assembly intermediate said upstream opening and said outlet ports constructed and arranged to permit flow of fluid in a direction downstream in the passage, a spider slidable axially in the passage in the region of the outlet ports, a cylindrical flange defining the periphery of the spider, the spider having a bore extending therethrough co-axial with the flange, said flange being of sufficient axial length to cover the outlet ports, first stop means upstream of the outlet ports for limiting axial movement of the spider in an upstream direction to a position where the flange covers the outlet ports, second stop means downstream of the outlet ports for limiting axial movement of the spider in a downstream direction to a position when the outlet ports are not covered by the flange, the spider having a plurality of openings formed therein for permitting flow of fluid in the passage in a direction upstream through the passage from the withdrawal opening, a stem axially slidable in said bore, a valve disc fixed on the upstream end of the stem and of sufficient area to cover the spider openings, said disc being movable away from the spider in response to flow of fluid upstream in the passage, and spring means biasing the spider in a direction toward said first stop means.

5. A valve assembly comprising a tubular body having a flow passage extending axially therethrough and defining an inside wall for the body, one end of the passage defining a first opening, the other end of the passage defining a withdrawal opening, the body having a plurality of outlet ports formed therein and disposed in a circumferentially arranged series around the body in a plane passing transversely through the body intermediate said openings, a spider slidable axially in the passage in the region of the ports, a cylindrical flange defining the periphery of the spider, said flange being of sufficient axial length to cover the outlet ports when in the plane of the outlet ports, the spider having a bore extending therethrough co-axial with the flange, first stop means in the passage between the outlet ports and said first opening for limiting axial movement of the spider in a direction toward said first opening to a position where the flange covers the ports, second stop means in the passage between the outlet ports and the withdrawal opening for limiting axial movement of the spider in a direction away from said first opening to a position where the ports are not covered by the flange, the spider having a plurality of openings formed therein for permitting flow of fluid in the passage in a direction from the withdrawal opening, a stem axially slidable in said bore, a valve disc fixed on that end of the stem directed toward the said first opening, the disc being of sufficient area to cover the spider openings, and spring means biasing the spider in a direction toward said first stop means.

6. A tank having a top wall and a bottom wall, said top wall having a valve receiving aperture formed therein, and a valve assembly mounted in the aperture for controlling flow of fluid into the tank; said valve assembly comprising a tubular body having a flow passage extending axially therethrough and defining an inside wall for the body, one end of the passage defining a first opening, the other end of the passage defining a withdrawal opening interior of the tank, the body having a plurality of outlet ports formed therein and disposed in a circumferentially arranged series around the body in a plane passing transversely through the body intermediate said openings and interior of the tank, a spider slidable axially in the passage in the region of the ports, a cylindrical flange defining the periphery of the spider, said flange being of sufficient axial length to cover the outlet ports when in the plane of the outlet ports, the spider having a bore extending therethrough co-axial with the flange, first stop means in the passage between the outlet ports and said first opening for limiting axial movement of the spider in a direction toward said first opening to a position where the flange covers the ports, second stop means in the passage between the outlet ports and the withdrawal opening for limiting axial movement of the spider in a direction away from said first opening to a position where the ports are not covered by the flange, the spider having a plurality of openings formed therein for permitting flow of fluid in the passage in a direction from the withdrawal opening, a stem axially slidable in said bore, a valve disc fixed on that end of the stem directed toward the said first opening, the disc being of sufficient area to cover the spider openings, and spring means biasing the spider in a direction toward said first stop means; and a conduit having one end thereof adjacent the said bottom wall and the other end thereof connected to the valve body at the said withdrawal opening of the body.

References Cited in the file of this patent

UNITED STATES PATENTS

| | | |
|---|---|---|
| 104,025 | Harvey | June 7, 1870 |
| 452,678 | McFarlane et al. | May 19, 1891 |
| 2,327,830 | Stevenson et al. | Aug. 24, 1943 |
| 2,361,866 | Norway | Oct. 31, 1944 |
| 2,563,244 | Holicer | Aug. 7, 1951 |
| 2,705,102 | Slattery | Mar. 29, 1955 |
| 2,713,874 | Sundstrom | July 26, 1955 |

FOREIGN PATENTS

| | | |
|---|---|---|
| 692,765 | France | Aug. 5, 1943 |
| 734,899 | Germany | Apr. 30, 1943 |